United States Patent [19]
Brodskiy

[11] Patent Number: 5,828,749
[45] Date of Patent: Oct. 27, 1998

[54] PHONE HOLDER KIT

[76] Inventor: Arkadiy Brodskiy, 1255-10th Ave. #6, San Francisco, Calif. 94122

[21] Appl. No.: 832,942

[22] Filed: Apr. 4, 1997

[51] Int. Cl.[6] .............................. H04M 1/05; A45F 5/14
[52] U.S. Cl. ..................... 379/430; 379/430; 379/446; 379/455; 379/449; 379/440; 224/181
[58] Field of Search ................... 379/430, 446, 379/455, 449, 440

[56] References Cited

U.S. PATENT DOCUMENTS

| | | | |
|---|---|---|---|
| 4,121,061 | 10/1978 | Donaldson. | |
| 4,878,237 | 10/1989 | Cianflone | 379/58 |
| 4,893,344 | 1/1990 | Tragardit et al. | 381/187 |
| 5,407,113 | 4/1995 | Golliher | 224/181 |

*Primary Examiner*—Scott L. Weaver
*Assistant Examiner*—Shih-Wen Hsieh

[57] ABSTRACT

A phone holder kit comprising a box-like cradle (10, 100, 200) for accommodating a telephone set (11) and a pair of flexible headbands (12 and 14) for supporting the cradle on the user's head. Addition support is ensured by a ear mount (16) attached to the ends of headbands (12 and 14) on the side opposite to the position of the cradle. The cradle has a rubber band (30) or a padded platform (108) which supports the telephone set (11) and which can be adjusted within the cradle for adjusting the depth of location of the telephone in the cradle, depending on the dimensions of the telephone set.

8 Claims, 6 Drawing Sheets

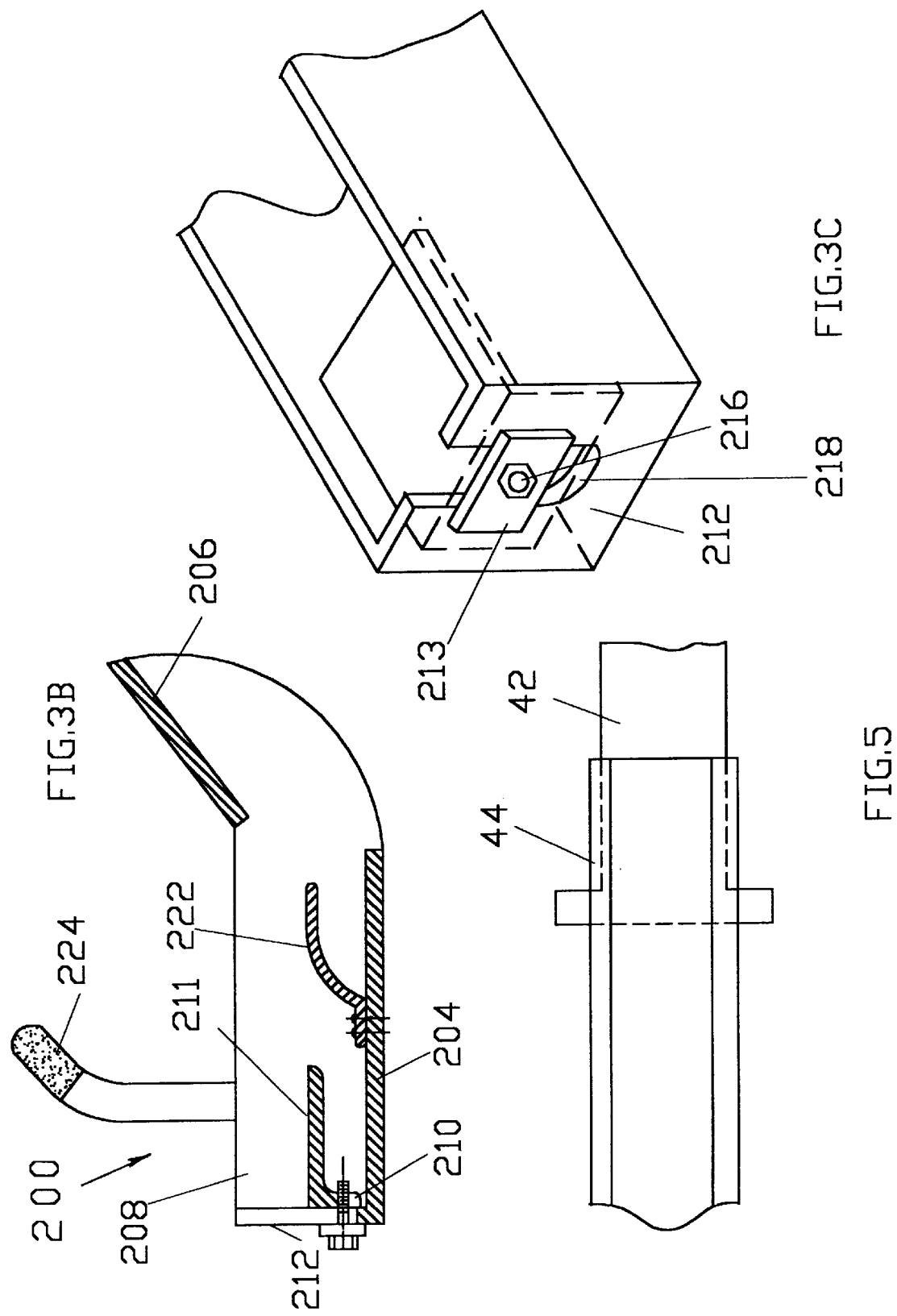

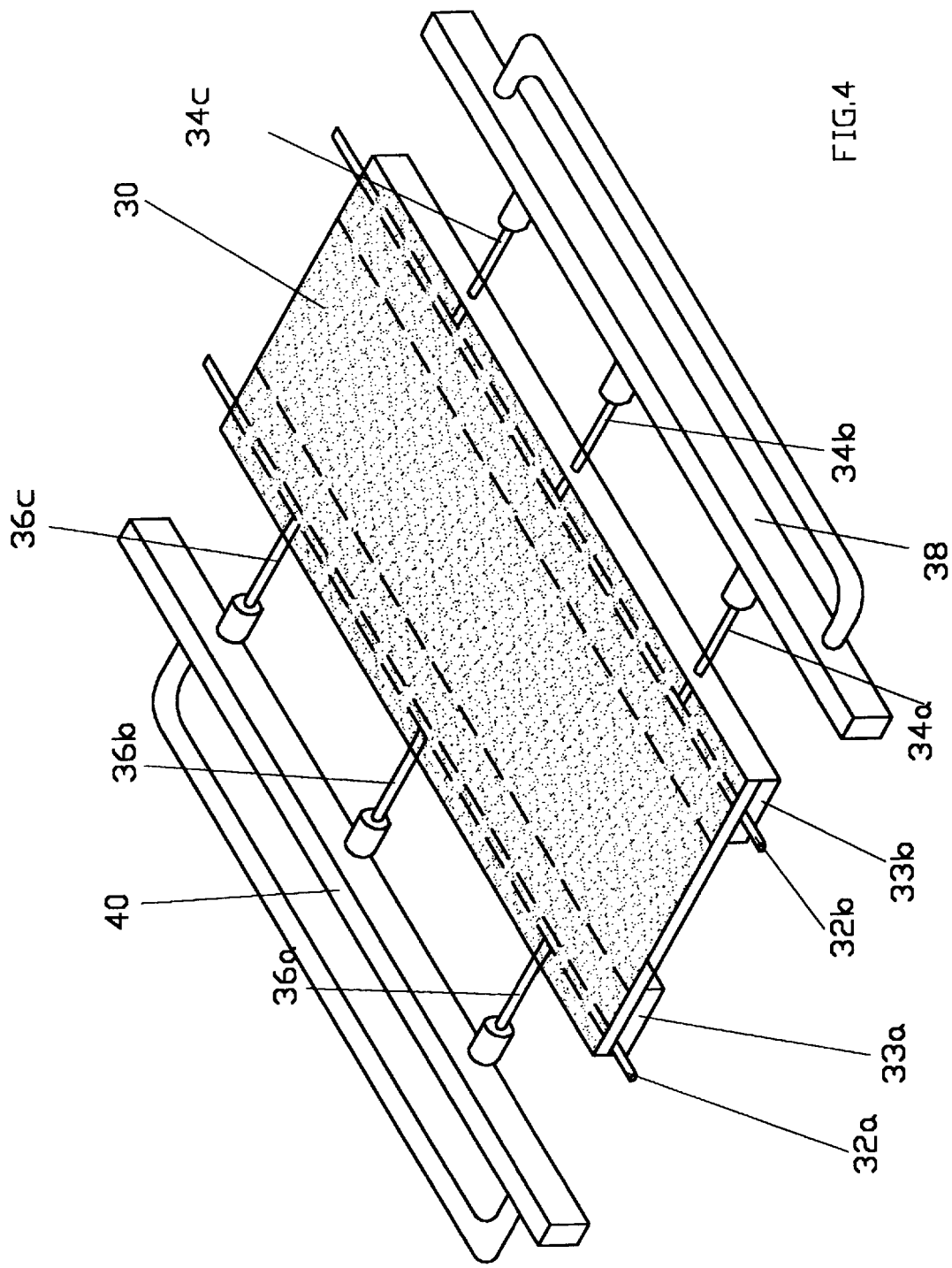

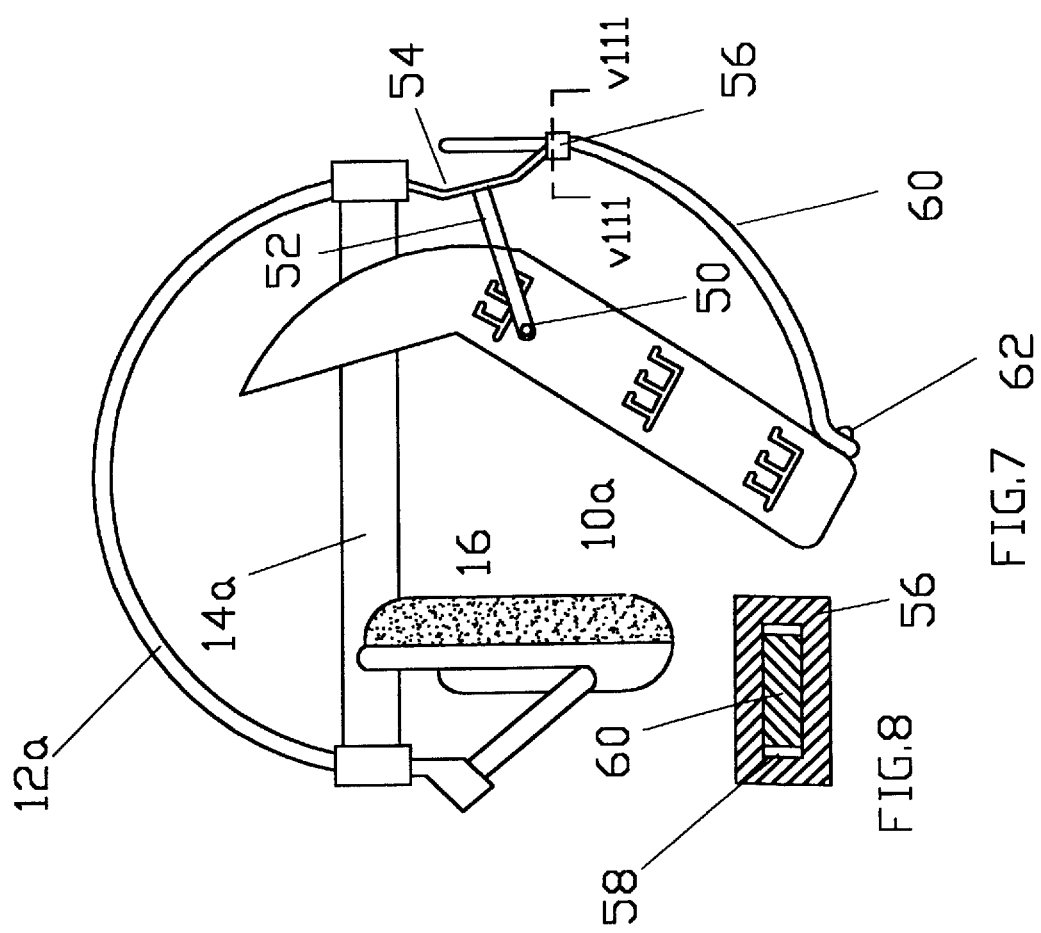

PHONE HOLDER KIT

FIELD OF THE INVENTION

The invention relates to telephones, and, more particularly to a phone holder kit that allows a phone to be used without holding it by hand during conversation. More specifically, the invention deals with a simple and comfortable device of a hand-free phone holder type which can accommodate phone sets of any type and size.

BACKGROUND OF THE INVENTION

Telephone communication is finding an ever growing use as a link between subscribers separated by long distances. This communication is necessary both for personal everyday use and for transmission of urgent information such as business messages, emergency calls, etc.

Cellular phone communication has been heavily used recently. This is associated with the development and ever growing use of portable cellular phone sets such as cellular phones made by Motorola and other companies.

These telephone sets allow telephone communication to be established substantially in any location—from the street, from public and residential buildings, vehicles, etc.

It is known that the phone set has to be held by hand against the ear during a telephone conversation, and this is not always convenient. Thus, a driver in a vehicle has to hold the telephone set with one hand while driving. In doing so, the driver limits the field of vision on the side of the hand holding the telephone set. Moreover, in the case a traffic situation occurs that requires the use of both hands, the hand that holds the telephone set is not immediately available for vehicle control. Additionally, if the driver holds the telephone set with one hand, this posture distract his attention from the traffic situation and put the driver under stress.

During conversation in an office or at home, it is difficult to do something while conversing, because the speaker should hold the telephone set with one hand or with a shoulder. To save time, the hand that holds the telephone set against the ear could be used for writing, picking up objects, etc., without interrupting the conversation.

Certain attempts have been made to bring solution to the above-described problems.

A device is known for supporting a telephone set by the shoulder, which is in the form of a molded anatomically designed piece positioned between the telephone set and the shoulder (see U.S. Pat. No. 4878237 issued to Sianflone in 1997). This device is deficient, because the user has to press the telephone set by inclining the head sidewise. This is a very uncomfortable posture, especially if it should be taken frequently during the day or during long period of time.

It is known to attach a telephone set to the head by means of straps (cf. U.S. Pat. No. 5,407,113 to Clayton R. Golliher, 1995). This device is simple and versatile, but it does not assure comfort because the straps holding the telephone set extend over the face of the user.

OBJECTS OF THE INVENTION

It is an object of the invention to provide a hand-free telephone holder kit, which could be used with a maximum possible degree of comfort during a telephone conversation and would take a minimum possible time to put the telephone set into the position of use and to remove the telephone set after the use.

Other objects and advantages of the invention will be come apparent from the following detailed description of its specific embodiment, with reference to the accompanying drawings.

BRIEF DESCRIPTION OF THE DRAWINGS

FIG. 3B is a longitudinal sectional view of a telephone-holding cradle in accordance with a third embodiment of the invention.

FIG. 3C is a fragmental three-dimensional view of the cradle of FIG. 3B from the front end side of the cradle.

FIG. 4 is a three-dimensional view of a telephone supporting means in the form of a rubber band with transverse projections for adjusting a position of the band in the cradle.

FIG. 5 is a view of a portion of one of the adjustable headbands.

FIG. 7 is general view of a phone holder kit with an additional cradle support strip connected to one of the flexible headbands.

FIG. 8 is a sectional view along line VIII—VIII of FIG. 7.

SUMMARY

Figures 1, 2:
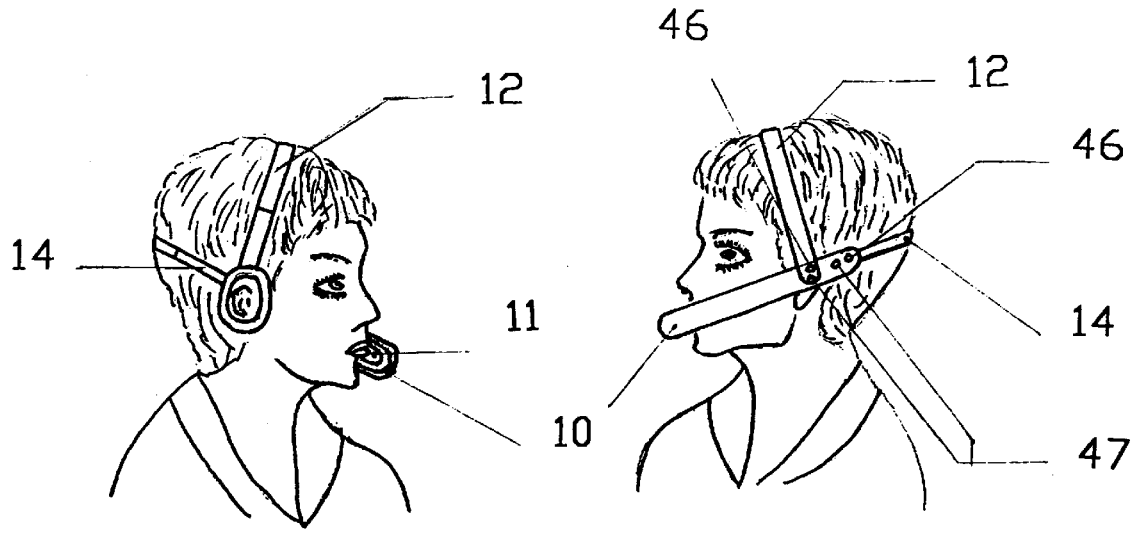
FIG. 1 is a view of a phone holder kit on the head of a user from the left-hand side of the user's head.
FIG. 2 is a view of a phone holder kit on the head of the user from the right-hand side of the user's head.

A phone holder kit comprising a box-like cradle (10, 100, 200) for accommodating a telephone set (11) and a pair of flexible headbands (12 and 14) for supporting the cradle on the user's head. An addition support is ensured by a ear mount (16) attached to the ends of headbands (12 and 14) on the side opposite to the position of the cradle. The cradle has a rubber band (30) or a padded platform (108) which supports the telephone set (11) and which can be adjusted within the cradle for adjusting the depth of location of the telephone in the cradle, depending on the dimensions of the telephone set.

DETAILED DESCRIPTION OF THE INVENTION

A general view of a phone holder kit of the invention is shown in FIGS. 1 and 2, where FIG. 1 is a view of the kit on the user's head from the left-hand side, and FIG. 2 is a view of the kit from the right-hand side of the user's head.

In general, the device consists of a cradle 10 for accommodating a telephone set 11 (FIG. 2), two flexible headbands 12 and 14 attached to cradle 10 for securing the cradle on the user's head and for positioning telephone set 11 supported by cradle 10 laterally against the user's ear (the left ear of the user in the view shown in FIG. 1), and a ear mount 16 which is used as an additional support for the unit against the user's ear opposite to the position of cradle 10.

The aforementioned parts of the phone holder kit will be further described separately in detail.

Figure 3:
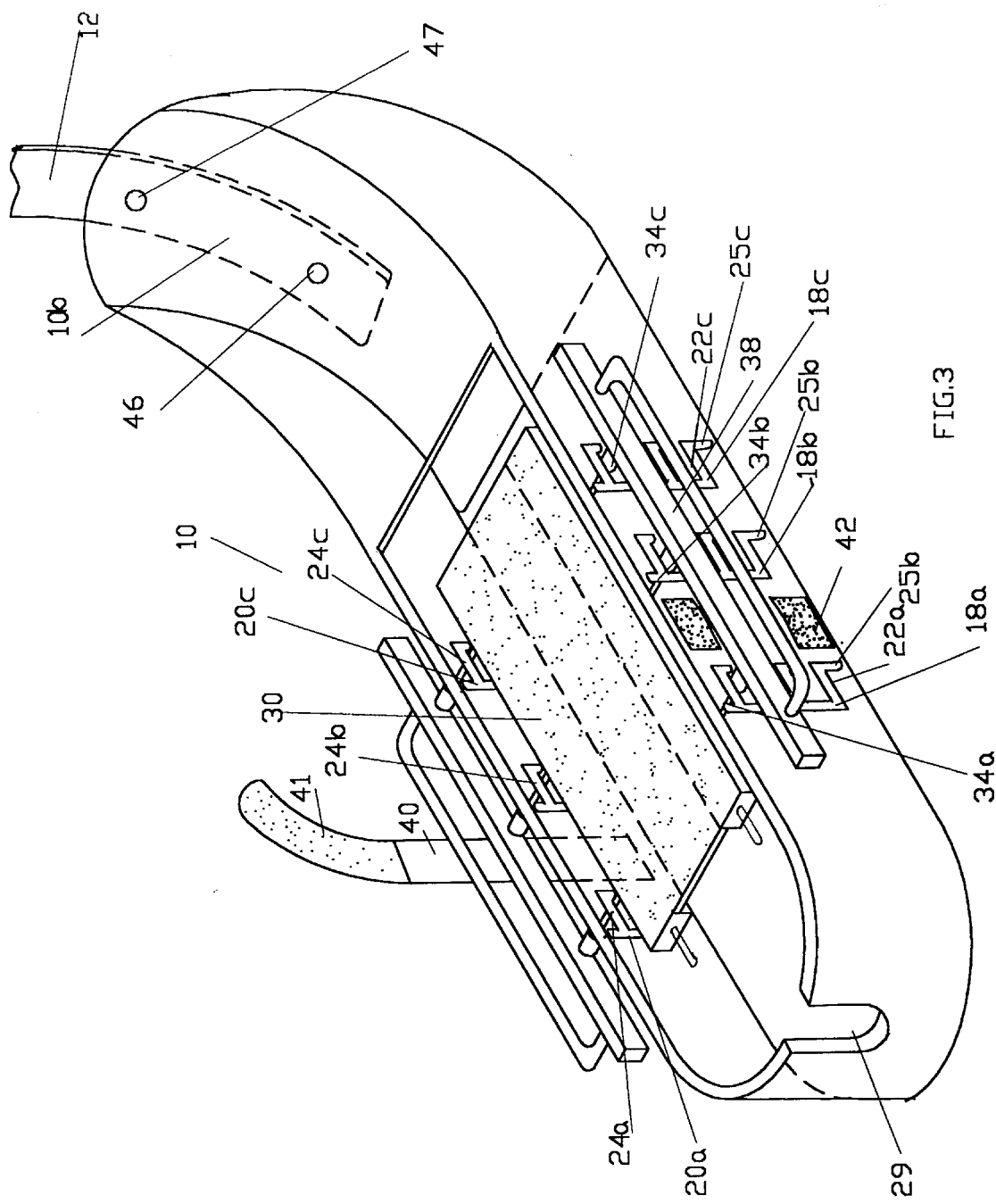
FIG. 3 is a three-dimensional view of a telephone-holding cradle made in accordance with one embodiment of the invention.

A general three-dimensional view of cradle 10 is shown in FIG. 3. Cradle 10 can be made of a light-weight and strong material, e. g., of plastic such as polystyrene. The use of plastic is preferable not only because of its light weight and strength, but also from the manufacturing point of view, because plastic can be easily molded at low cost. Plastic is also hygienic and is easy to clean and wash, e. g., to allow different people to use the same holder kit.

Cradle 10 has in general a box-like configuration with vertical slots 18a, 18b, 18c on one side of cradle 10 and vertical slots 20a, 20b, 20c on the other side of cradle 10 (FIG. 3). Horizontal slots 22a, 22b, 22c are branched from vertical slots 18a, 18b, and 18c, and horizontal slots 24a, 24b, and 24c are branched from vertical slots 20a, 20b, and 20c. Although three horizontal slots are shown branched from each vertical slot of cradle 10, in order not to obscure the drawing, only one such slot is designated by a respective reference numeral 22a, 22b, etc., for each vertical slot in FIG. 3. Respective horizontal slots 24a, 24b, and 24c are shown on the other side of cradle 10. Each horizontal slot on each side terminates in a small downward cutout 25a, 25b, 25c, respectively. The purpose of these cutouts will be explained later.

A recess 29 is made in bottom end wall 10a of cradle 10 if a telephone set placed into cradle 10 has a cord connecting it to a stationary telephone set or to a power supply (not shown).

A small ramp 10b with an inclined flat wall is provided in the top-end part of cradle 10 to assure a desired distance from the telephone set put into cradle 10 and the mouth of the user. Ramp 10b is pressed against the user's head by means of an adjustable spring headband 12 (FIG. 1).

To better adjust the depth of the telephone set (not shown in FIG. 3) in cradle 10 when it is pressed against the user's ear, a flexible elastic member 30, e. g., in the form of a rubber band is provided. As shown in FIG. 4, which is a three-dimensional view of rubber band 30 (which is shown without the cradle for the sake of clarity of the construction), band 30 has on its both sides longitudinal reinforcement wires or rods 32a and 32b fixed to the sides of rubber band 30, e.g., by strips 33a and 33b pasted to the bottom edges of band 30, e.g., by an adhesive.

Longitudinal rods 32a and 32b have lateral projections 34a, 34b, 34c on one side and 36a, 36b, and 36c on the opposite side of rubber band 30. Free ends of lateral projections 34a, 34b, and 34c are attached to a handle member 38, and lateral projections 36a, 36b, and 36c are attached to a handle member 40.

As shown in FIG. 3, rubber band 30 is supported in cradle 10 at a required height from the bottom of cradle 10 by means of aforementioned lateral projections 34a, 34b, 34c and 36a, 36b, 36c which are inserted into respective horizontal slots 22a, 22b, 22c and 24a, 24b, 24c and fixed in respective cutouts 25a, 25b, and 25c.

Thus, the depth of insertion of the telephone set (not shown in FIGS. 3 and 4) into cradle 10 can be adjusted by inserting lateral projections 34a, 34b, 34c and 36a, 36b, 36c into respective branched horizontal slots 22a, 22b, . . . . 24a, 24b, . . . and then into respective cutouts 25a, 25b, and 25c located at different vertical levels of the cradle on its both sides. This ensures contact of the telephone's earpiece (not shown) with the user's ear and keeps the telephone's mouthpiece (not shown) at a required distance from the user's mouth. Furthermore, adjustable rubber band 30 allows adjustment of the position of the telephone set in accordance with the shape and dimensions of the letter.

To fix the telephone in the adjusted position, a strap 40 secured at one end to cradle 10 can be used. Strap 40 may have a Velcro-type (trademark) patch 41 on the free end of strap 40 with another Velcro patch 42 pasted to the opposite side wall of cradle 10.

Figure 3A:
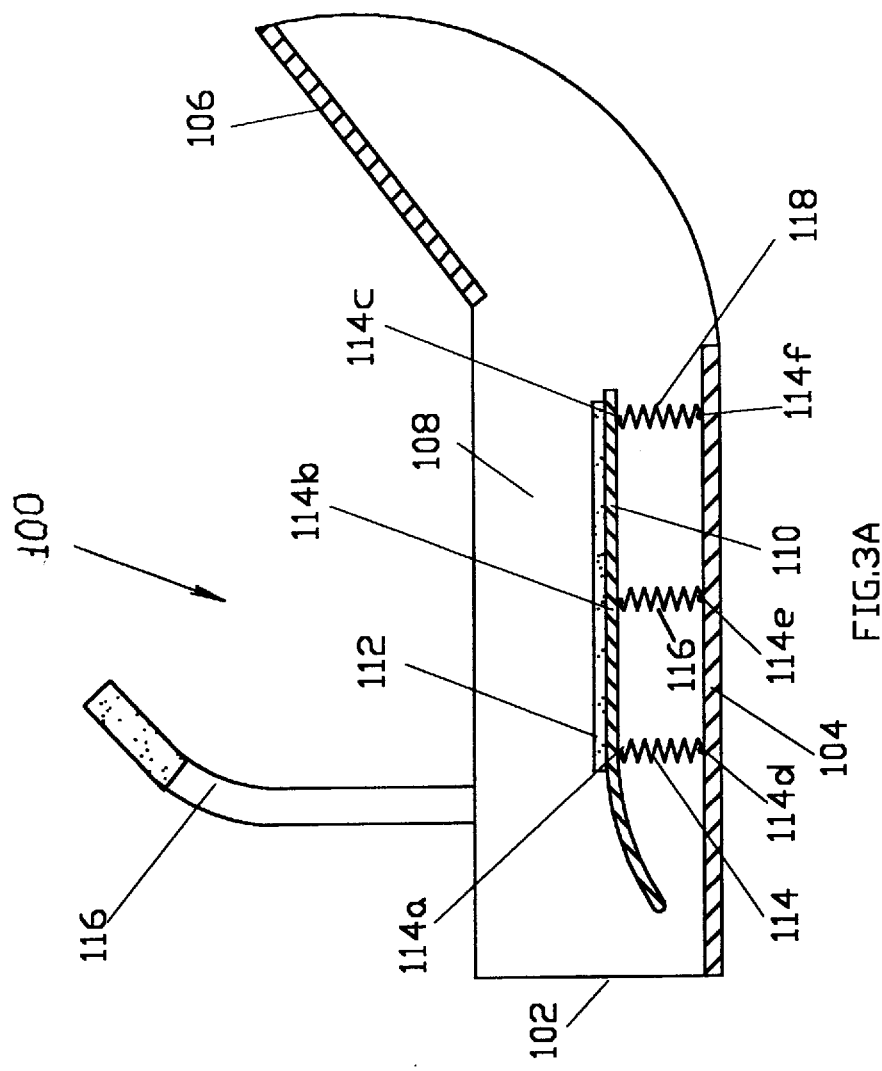
FIG. 3A is a longitudinal sectional view of a telephone-holding cradle in accordance with a second embodiment of the invention.

Another embodiment of the cradle is shown in FIG. 3A, which is a sectional longitudinal view of the cradle. This cradle, which is designated by reference numeral 100, has exactly the same configuration as cradle 10, i.e., it has a slot 102 for the telephone cord (which is used if the telephone is connected to a source of power supply), a bottom portion 104, and a ramp portion 106. However, It differs from the cradle of the previous embodiment in that it has no slots in side walls and in that a rubber band 30 is replaced by a spring-loaded platform 108 for supporting telephone 11. Platform 108 may consist of a plastic or metal plate 110 covered with a soft pad such as foam plastic pad 112. Platform 108 is supported by a set of springs such as springs 114, 116, and 118. One end of each spring is attached to plate 110 at 114a, 114b, and 114c, and the other end of each spring is attached to bottom portion 104 at 114d, 114e, and 114f.

For this embodiment of the cradle, strap 116 of the same type as Velcro-type strap 40 of FIG. 3 is desirable as an additional means for securing telephone 11 in place. It is understood that cradle 100 should have another Velcro-type strap (not shown) such as pad 42 of FIG. 3 on the side of cradle opposite to strap 116.

Still another embodiment of the cradle is shown in FIG. 3B, which is a sectional longitudinal view of the cradle designated by reference numeral 200. Cradle 200 has exactly the same configuration as cradles 10 and 100, i.e., it has a slot 202 for the telephone cord, a bottom portion 204, and a ramp portion 206. However, it differs from the cradles of the previous embodiments in that it has a support plate 208 rigidly attached to a lower wall 210 of the cradle. Support plate 208 may have an L-shaped configuration consisting of a leg 211 parallel to bottom portion 204 and a leg 210 which is secured to the inner side of a lower wall 212 of the cradle by means of a bolt 214 and a nut 216. Bolt 214 passes through a cord slot 218 (FIG. 3C) of bottom wall 212 which extends toward bottom portion 204. A plate 213 is used on the outer side of lower wall 212. This construction allows adjustment of a position of leg 211 with respect to bottom portion 204, in accordance with the depth of telephone 11 in cradle 200. In addition to leg 211 for supporting telephone 11 (not shown in FIG. 3B), cradle 200 has a leaf spring 222 attached to bottom portion 204.

For this embodiment of the cradle, strap 224 of the same type as Velcro-type strap 40 of FIG. 3 is desirable as an additional means for securing telephone 11 in place. It is understood that cradle 200 should have another Velcro-type strap (not shown) such as pad 42 of FIG. 3 on the side of cradle opposite to strap 116.

Headbands 12 and 14 may have an adjustable construction and formed, e.g., as spring headbands. As shown in FIG. 5 which is a view of a portion of one of the adjustable headbands, each headband consists of two leaf spring members 42 and 44 frictionally sliding one inside the other for telescopically extending or reducing the length of each headband and maintaining it in the adjusted position due to tight friction engagement between both leaf spring members. Such a construction is known and is used, e.g., for a conventional headphone.

One end of headband 14 is rigidly connected to cradle 10, e.g., by two pins 46 and 47 (FIG. 1) and another end of headband 14 is connected to aforementioned ear mount 16 (FIG. 2). Similarly, one end of headband 12 is connected to cradle 10 with the use of the same pins 46 and 47, and another end is connected to ear mount 16. The function of headband 12 is to support the cantilevered lower portion of cradle 10, especially if the telephone set is heavy.

Figure 6:
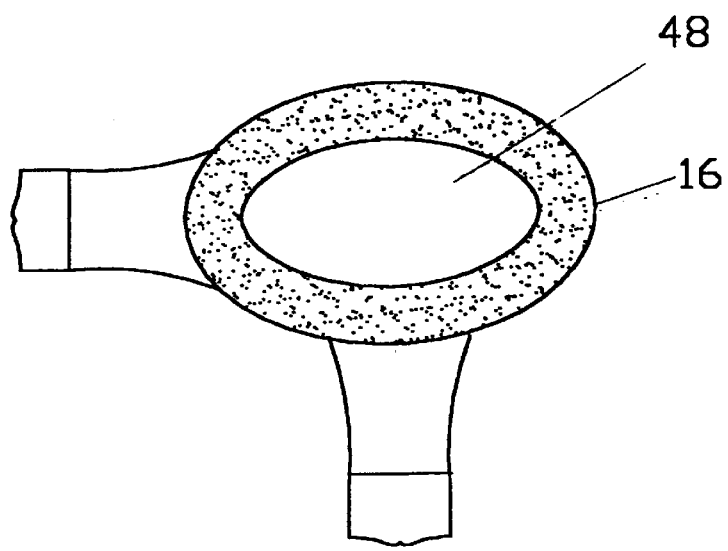
FIG. 6 is a top view of a ear mount.

As shown in FIG. 6, ear mount 16 is made in the form of a mounting piece with an ellipse-shaped opening 48. The ear mount is preferably made of plastic. The side of the ear mount that is to be pressed to the ear is trimmed with a soft material such as a foamed plastic pad 50.

As the mouthpiece and the earpiece in all telephone sets are normally spaced at an anatomically determined distance, practically all telephone sets are of the same length, so that it would be easy to accommodate any telephone set in the cradle of one size.

It is understood that for the safety of driving, the telephone set may be equipped with a remote control unit (which is not shown and is not a part of the present invention). Such remote control units for switching the telephone ON or OFF at a required time may be installed at a convenient location. The telephone may be installed into cradle 10, and cradle 10 can be attached to the user's head prior to driving.

Prior to use of the telephone holder set according to the invention, rubber band 30 is first adjusted in cradle 10 to install the telephone at a required depth within cradle 10. This is done by inserting lateral projections 34*a*, 34*b*, 34*c* and 36*a*, 36*b*, 36*c* into the chosen horizontal slots 22*a*, 22*b*, 22*c* and 24*a*, 24*b*, 24*c* and then into respective cutouts 25*a*, 25*b*, 25*c*.

The telephone holder set is then put on the head as shown in FIGS. 1 and 2 by extending or contracting headbands 12 and 14 in accordance with the size of the user's head. In doing this, cradle 10 is put into a position in which the top part of the box-like portion of the cradle is located directly opposite to the ear and in which ramp portion 10*b* conforms to the shape of the user's head. Ear mount 16 is put on the other ear to enclose it. Hole 48 of ear mount 16 allows the surrounding sounds to be heard when the telephone holder kit is on the head.

When cradle 10 is affixed to the head as described above and when it is necessary to insert telephone set 11, cradle 10 it is pulled away at a certain distance with one hand, and the telephone set is placed into the cradle with the other hand. The telephone insertion operation is identical for cradles of all embodiments, i.e., for cradles 10, 100, and 200. The telephone is inserted from the lower portion of each cradle in the aforementioned pulled-away position. If necessary and when the user's hands are free, the telephone set is additionally fixed in cradle 10 by fastening it with strap 40 with the aid of Velcro patches 41 and 42.

When the telephone set is not in use, cradle 10 can be pulled away at a certain distance to remove telephone set 11 from the cradle. If no other conversation is planned for the moment, the telephone holder kit can be taken off the head with the telephone set that is held in the interior of the cradle by strap 40.

Another embodiment of the hand-free telephone holder kit of the invention is shown in FIG. 7. In this embodiment, cradle 10*a*, ear mount 16*a*, and headbands 12*a* and 14*a* are essentially the same as those shown and described for the previous embodiment with reference to FIGS. 1 through 6. However, the hand-free telephone holder kit of FIG. 7 differs in that cradle 10*a* is pivotally connected at 50 to a T-shaped bracket. This bracket may be made, e.g., of plastic and consists of a U-shaped member 52 that embraces cradle 10 from both side and a transverse member 54. One end of transverse member 54 is rigidly attached to headband 12*a* and to headband 14*a* at their cradle ends. The other end of transverse member 54 has a guide block 56. As shown in FIG. 8 which is a sectional view along line VIII—VIII of FIG. 7, guide block 56 has a slot 58. One end, i.e., the upper end of an arch-shaped leaf-spring member 60 which is made, e.g., of a spring steel, is frictionally inserted into slot 58 so that it can slide in slot 58 and can be frictionally fixed in a require position of this slot due to friction forces between the walls of slot 58 and the surface of leaf-spring member 60. The opposite, i.e., the lower end of leaf-spring member 60 is rigidly attached, e.g., by means of a rivet 62, to cradle 10*a*.

This construction allows to adjust the position of the lower end of cradle 10*a* at a required distance from the user's mouth and to maintain the cradle and hence telephone set 11 inserted into in a required position. In addition, leaf-spring member 60 provides an additional support and better stability for the telephone set in use.

Thus it has been shown that the invention provides a hand-free telephone holder kit, which is simple in construction, suitable for telephone sets of different types and dimensions, could be used with a maximum possible degree of comfort during a telephone conversation and would take a minimum possible time to put the telephone set into the position of use and to remove the telephone set after the use.

Although the invention was illustrated and described with reference to specific embodiments, it is understood that these embodiment does not limit the field of application of the invention. In other words, many modifications are possible. For example, the ear mount and the cradle can be placed on the sides of the user's head opposite to those shown in FIGS. 1 and 2. Vertical slots 18*a*, 18*b*, etc., may be cut as through slots extended up to the edge of the box-like cradle. Horizontal slots with cutouts may be replaced by inclined or curved lateral slots. The bottom of the cradle may be continuous or formed by transverse straps used for rigidly. Headbands 14 and 12 may be rigidly attached to the cradle at different points of the cradle rather than by the same pins 46 and 47. Rubber band 30 may consist of a plurality of separate transverse straps, or the band may be replaced by a plastic plate padded with a soft material. The ramp portion may be made in the form of a separate element which is pivotally connected to the cradle and can be turned and fixed in a required position. Thus any modifications and changes are possible, provided they do not depart from the scope of the appended claims.

I claim:

1. A phone holder kit comprising:

a box-like cradle for accommodating a telephone set insertable in said box-like cradle, said box-like cradle having one side wall, another side wall, a front end, a rear end, and a bottom portion, said rear end having a ramp portion;

a first headband of a flexible material for supporting said box-like cradle on the user's head, one end of said first headband being rigidly attached to said rear end of said box-like cradle and extending further from said ramp portion around the rear side of the user's head;

a ear mount which is attached to the end of said first headband opposite to said one end, said ear mount being located in a position corresponding to the user's ear on the side opposite to the location of said box-like cradle; and second headband of a flexible material which has one end rigidly attached to said box-like cradle and the other end attached to said ear mount, said second headband being arranged at an angle to said first headband so that the second headband embraces the user's head essentially over the head top, said cradle further including a telephone support means and means for adjusting position of said telephone support means in said cradle with regard to said bottom portion.

2. The phone holder kit of claim 1, wherein said telephone support means is a resilient band having projections on both sides, and said means for adjusting are slots formed in said side walls, said slots receiving said projections, said slots having branches at different levels, said projections being selectively insertable into said branches so that by inserting said projections into respective branches it is possible to adjust the position of said resilient band with respect to said bottom portion.

3. The phone holder kit of claim 2, wherein said slots extend in a direction perpendicular to said bottom portion and said branches extend substantially parallel to said bottom portion and said slot ends are turned downward toward said bottom portion to fix said projections in the adjusted position of said telephone support means.

4. The phone holder kit of claim 3 wherein said cradle has additional means for locking the telephone in said box-like cradle, said additional means for locking being made in the form of a strap one end of which is attached to one of said side walls of said box-like cradle and another end has a first fastening means, and a second fastening means attached to another side wall of said box-like cradle, said first fastening means being engageable with said second fastening means.

5. The phone holder kit of claim 1, wherein said second headband has a U-shaped member, that is pivotally connected to and embraces said box-like cradle, and a transverse piece, said transverse piece being connected at one end to said second headband and having a slot at the other end; and a flexible strap, one end of said flexible strap being in contact with said box-like cradle and the other end of said flexible strap being slidingly and frictionally inserted into said slot.

6. The phone holder kit of claim 5, wherein said telephone support means is a resilient band having projections on both sides, and said means for adjusting are slots formed in said side walls, said slots receiving said projections, said slots having branches at different levels, said projections being selectively insertable into said branches so that, by inserting said projections into respective branches, enabling adjustment of the position of said resilient band with respect to said bottom portion.

7. The phone holder kit of claim 6, wherein said slots extend in the direction perpendicular to said bottom portion and said branches extend substantially parallel to said bottom portion and said slot ends are turned downward toward said bottom portion to fix said projections in the adjusted position of said telephone support means.

8. The phone holder kit of claim 7 wherein said cradle has additional means for locking the telephone in said box-like cradle, said additional means for locking being made in the form of a strap one end of which being attached to one of said side walls of said box-like cradle and another end having first fastening means, and a second fastening means attached to another side wall of said box-like cradle, said first fastening means being engageable with said second fastening means.

\* \* \* \* \*